(12) United States Patent
Shimizu et al.

(10) Patent No.: US 12,194,944 B2
(45) Date of Patent: Jan. 14, 2025

(54) AIRBAG DEVICE

(71) Applicant: Autoliv Development AB, Vargarda (SE)

(72) Inventors: Takayuki Shimizu, Kanagawa (JP); Atsushi Nakashima, Kanagawa (JP); Yosuke Shimizu, Kanagawa (JP); Yoshinori Beppu, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/554,939

(22) PCT Filed: Mar. 14, 2022

(86) PCT No.: PCT/JP2022/011207
§ 371 (c)(1),
(2) Date: Oct. 11, 2023

(87) PCT Pub. No.: WO2022/219983
PCT Pub. Date: Oct. 20, 2022

(65) Prior Publication Data
US 2024/0198948 A1   Jun. 20, 2024

(30) Foreign Application Priority Data
Apr. 16, 2021 (JP) ................. 2021-069707

(51) Int. Cl.
*B60R 21/207* (2006.01)
*B60R 21/231* (2011.01)
(Continued)

(52) U.S. Cl.
CPC ...... *B60R 21/207* (2013.01); *B60R 21/23138* (2013.01); *B60R 21/233* (2013.01);
(Continued)

(58) Field of Classification Search
CPC ............ B60R 21/207; B60R 21/23138; B60R 21/233; B60R 21/2338;
(Continued)

(56) References Cited

U.S. PATENT DOCUMENTS

2009/0039630 A1\* 2/2009 Schneider ........... B60R 21/2346
280/739
2018/0194317 A1 7/2018 Barbat et al.
(Continued)

FOREIGN PATENT DOCUMENTS

EP 3581441 A1 12/2019
JP 2009-154812 A 7/2009
(Continued)

*Primary Examiner* — Karen Beck
(74) *Attorney, Agent, or Firm* — Harness, Dickey & Pierce, P.L.C.; Stephen T. Olson

(57) ABSTRACT

An airbag device has a first side cushion that expands forward to cover one side of an occupant seated in the seat of the vehicle, a second side cushion that expands forward to cover the other side of the occupant, at least one inflator that injects gas to inflate the first side cushion and the second side cushion, and a connection that connects the first side cushion and the second side cushion. The connecting part is deployed so as to pass through the rear surface region between the seat 1 and the occupant above the seat surface of the seat in the fully expanded state when the expansion and deployment of each side cushion and is complete, and is held in place by the occupant, pulling each side cushion and inward.

12 Claims, 11 Drawing Sheets

(51) Int. Cl.
*B60R 21/233* (2006.01)
*B60R 21/2338* (2011.01)
(52) U.S. Cl.
CPC ............... *B60R 21/2338* (2013.01); *B60R 2021/23146* (2013.01); *B60R 2021/23161* (2013.01); *B60R 2021/23386* (2013.01)
(58) Field of Classification Search
CPC .......... B60R 2021/23146; B60R 2021/23161; B60R 2021/23386; B60R 21/237
See application file for complete search history.

(56) References Cited

U.S. PATENT DOCUMENTS

2024/0140348 A1* 5/2024 Jang ................ B60R 21/231
2024/0140350 A1* 5/2024 Ko .................. B60R 21/237

FOREIGN PATENT DOCUMENTS

| | | |
|---|---|---|
| JP | 2013-220714 A | 10/2013 |
| JP | 2016-203945 A | 12/2016 |
| JP | 2019-018593 A | 2/2019 |
| JP | 2020-501971 A | 1/2020 |
| JP | 2020-164129 A | 10/2020 |
| JP | 2020-164131 A | 10/2020 |
| JP | 2021-024558 A | 2/2021 |
| WO | 2021/033433 A1 | 2/2021 |
| WO | 2021/059766 A1 | 4/2021 |
| WO | 2021/065304 A1 | 4/2021 |

* cited by examiner (a)

(b)

(a)

(b)

AIRBAG DEVICE

TECHNICAL FIELD

The present invention relates to an airbag device that protects a side or the like of an occupant.

BACKGROUND ART

There are known conventional airbag devices for protecting an occupant during a vehicle side collision or rollover. In these types of airbag devices, the airbag expands and deploys so as to cover the sides of the occupant seated in a seat.

Patent Document 1 describes this type of airbag device as an occupant restraining device that can provide protection against both near side and far side impacts to the occupant. This occupant restraining device is provided with an airbag that protects an occupant in a near side collision and an upper torso restraining member that protects the occupant in a far side collision. The upper torso restraining member makes contact with shoulders and chest of the occupant from the front side of the vehicle and restrains the occupant to their seat. FIG. 6 of Patent Document 1 describes a form that uses the airbag as the upper torso restraining member.

RELATED ART DOCUMENTS

Patent Documents

Patent Document 1 Japanese Unexamined Patent Application 2018-135016.

SUMMARY OF THE INVENTION

Problem to be Solved by the Invention

Incidentally, in the airbag device described in Patent Document 1, the near side airbag expands and deploys to cover the side of the torso of the occupant, and the far side airbag expands and deploys through the upper side of the shoulder of the occupant to the front side of the chest of the occupant. The near side airbag is located a short distance away from the occupant (see FIG. 1 in Patent Document 1). Conventional airbag devices are not capable of restraining occupants on both sides of the vehicle at an early stage.

An object of the present invention is to achieve an airbag device capable of restraining occupants on both sides of the vehicle at an early stage, such as during a side collision of the vehicle.

Means for Solving the Problem

The airbag device according to the present invention is provided with a first side cushion that expands and deploys forward to cover one side of an occupant seated in a seat of a vehicle, a second side cushion that expands and deploys forward to cover the other side of the occupant, at least one inflator that injects gas to inflate the first side cushion and second side cushion, and a connecting part that connects the first side cushion and second side cushion. The connecting part is deployed so as to pass through the rear surface region between the seat and the occupant above the seat surface of the seat in the fully expanded state when the expansion and deployment of each side cushion is complete, and is held in place by the occupant, pulling each side cushion inward.

In a fully expanded state, the connecting part may connect the front part of the first side cushion to the front part of the second side cushion.

In the present invention, in a fully expanded state, both the connecting point of the connecting part in the first side cushion and the connecting point of the connecting part in the second side cushion may be positioned at a front part of the torso of the occupant in the front-to-back direction.

In the present invention, in the rear surface region in the fully expanded state, the connecting part may be positioned in a range of height from the waist to the shoulder of the occupant.

The present invention is further provided with a cushion connecting part, connecting, in a fully expanded state, the rear part of the first side cushion and the rear part of the second side cushion, where mutually integrating the first side cushion, second side cushion, and cushion connecting part composes one airbag, and the connecting part is stowed in the seat folded with the airbag in a state overlapped on the lower side of the airbag in a fully expanded state.

The present invention may be further provided with a cushion connecting part that connects, in a fully expanded state, the rear part of the first side cushion to the rear part of the second side cushion, and the connecting part may connect the front part of the first side cushion to the cushion connecting part or to the rear part of the second side cushion.

In the present invention, the first side cushion may have a first head cushion part that expands and deploys to cover one side of the head of the occupant, the second side cushion may have a second head cushion part that expands and deploys to cover the opposite side of the head of the occupant, and the connecting part may connect the top part of the first head cushion part to the top part of the second head cushion part.

The present invention may allow the connection to pass through the rear surface region from the side of one side of the occupant to the side of the other side of the occupant in the fully expanded state.

The present invention may allow the connection to partially pass through the interior of the seat in a fully expanded state.

The present invention may have a first member connected at a first end to the first side cushion and at a second end to the seat, and a second member connected at a first end to the second side cushion and at the second end to the seat, connecting the first and second side cushions via the seat.

Effect of the Invention

In the present invention, when a vehicle collision occurs, the side cushions expand and deploy on either side of the occupant. The connecting part connecting the side cushions on both sides deploys so as to pass through the rear surface region between the seat and the occupant above the seat in the fully expanded state. The connecting part is held in place by the occupant, pulling each side cushion inward. This brings each side cushion closer to the occupant. The present invention allows for early restraint of occupants on both sides of the vehicle, such as in the event of a side impact of a vehicle.

BRIEF DESCRIPTION OF THE DRAWINGS

FIGS. 4(a) and 4(b) are diagrams where the connecting member is not included. FIGS. 4(c) and 4(d) are diagrams where the connecting member is included.

FIG. 12(a) is a diagram where the connecting member is not provided. FIG. 12(b) is a diagram where the connecting member is provided.

DESCRIPTION OF THE PREFERRED EMBODIMENTS

Figure 1A:
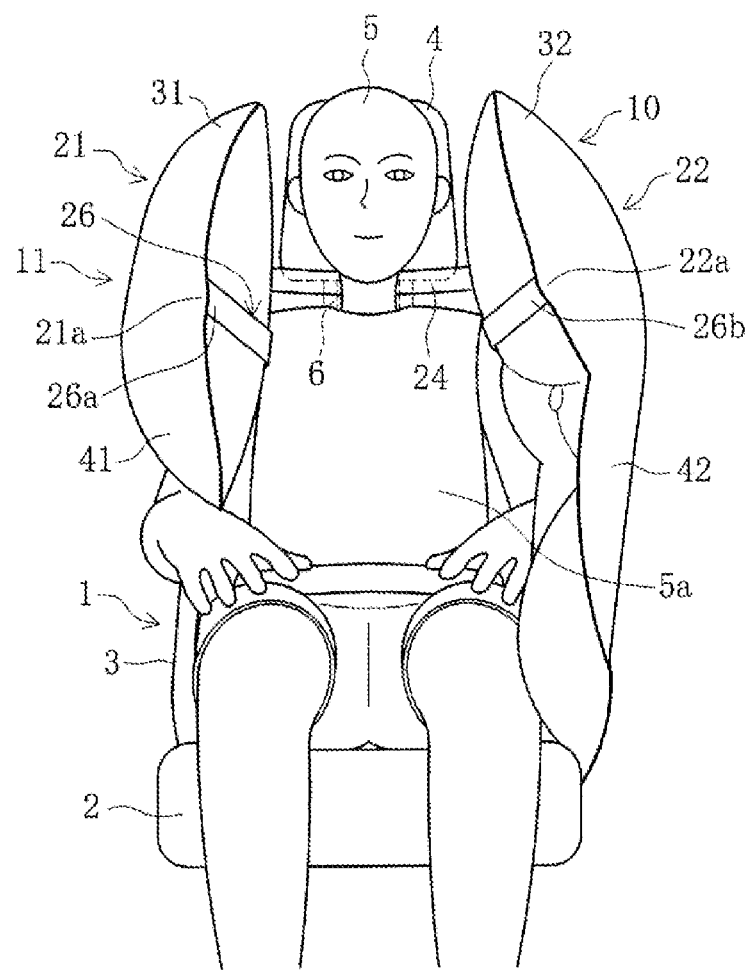
FIG. 1A is a diagram depicting an airbag in a fully expanded state of the airbag device according to Embodiment 1, viewed from the front with an occupant in the seat.

Embodiments of the present invention are described below in detail with reference to the drawings. Note that the following embodiments are examples of the present invention, and are not intended to limit the scope of the present invention, the application, or the uses thereof.

Note that in the present specification, the terms "upper" and "upper side" refer to a head direction of the occupant 5 seated in a regular position in the seat 1, and "lower" and "lower side" refer to a foot direction of the occupant 5. Herein, the "regular position" refers to a position in a center of a seat cushion 2 of the seat 1 in the left-right direction with the back of the occupant 5 in contact with the backrest section 3 from above and below. Furthermore, the terms "front" and "front side" refer to a front surface direction of the occupant 5 seated in the seat 1 in the regular position, and "rear" and "rear side" refer to a back surface direction of the occupant 5. Furthermore, the terms "left" and "left side" refer to a left-hand direction of the occupant 5 seated in the seat 1 in the regular position, and "right" and "right side" refer to the right-hand direction of the occupant 5. Furthermore, the occupant 5 assumes an AM50 (a 50th percentile of an adult male in US) of a WorldSID (World Side Impact Dummy).

Embodiment 1

The present embodiment is an airbag device 10 in which the first side cushion 21 and second side cushion 22 provided on both sides of the seat 1 of the vehicle are integrated into one airbag 11. The airbag device 10 is provided with a connecting member 26 for pulling in the side cushions 21 and 22 to the interior. Hereinafter, a description of the seat 1 to which the airbag device 10 is mounted will be given prior to the description of the airbag device 10.

[Schematic Configuration of Seat]

Figure 1B:
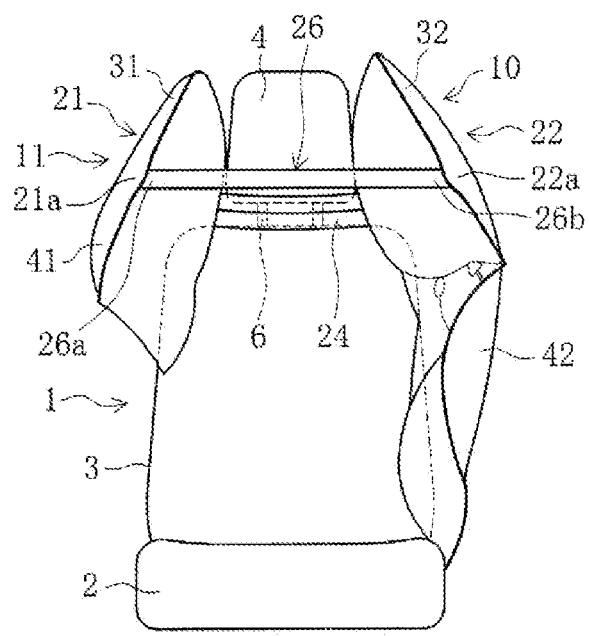
FIG. 1B is a diagram depicting an airbag in a fully expanded state, viewed from the front with no occupant in the seat.
Figure 1C:
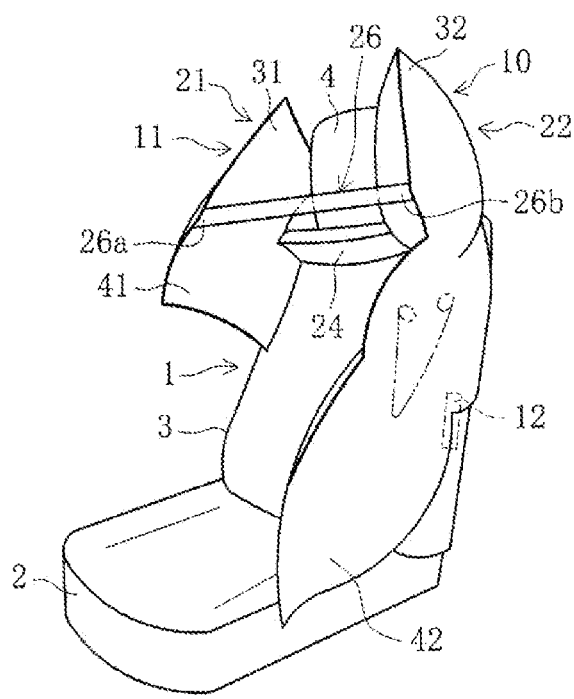
FIG. 1C is a diagram depicting an airbag in a fully expanded state, viewed obliquely from the front on the second side cushion side with no occupant in the seat.

As illustrated in FIG. 1A to 1C, the seat 1 is provided with the seat cushion 2 and the backrest section 3. The seat cushion 2 incorporates a seat pan (not depicted) that forms part of the seat frame, and the backrest section 3 incorporates a seat back frame 3a that forms part of the seat frame (see FIG. 3). The upper end part of the backrest section 3 has a headrest 4 attached via rod shaped support members 6. Note that for the seat 1, the headrest 4 may be integrally molded to the backrest section 3. Hereinafter, the side near the door for the seat 1 is referred to as the "near side", and the side away from the door for the seat 1 is referred to as the "far side".

[Configuration of Airbag Device]

The airbag device 10 is provided with an airbag 11 and an inflator 12 (see FIG. 1C). The airbag 11 is a cloth bag. The inflator 12 is a device for injecting gas that causes the airbag 11 to expand. Hereinafter, an example of the airbag device 10 provided for the adjoining driver's seat or occupant seat on the left and right will be described.

[Airbag in Fully Expanded State]

The state of expansion and deployment of the airbag 11 being complete (hereinafter called "fully expanded state") is described below with reference to FIG. 1. In the description of the airbag 11 in a fully expanded state, the occupant 5 is assumed to be seated in a regular positions.

As depicted in FIG. 1A, the airbag 11 has a first side cushion 21 that expands forward to cover one side of the occupant 5, a second side cushion 22 that expands forward to cover the other side of the occupant 5, and a cushion connecting part 24 that connects the first and second side cushions 21 and 22. The cushion connecting part 24 functions as a tubular duct through which gas can circulate during expansion and deployment of the airbag 11.

The first side cushion 21 is provided on the far side of the seat 1. The first side cushion 21 has the rear end part thereof secured to the far side of the seat 1. The first side cushion 21 extends forward from the point of being secured to the seat 1 (see FIG. 1C). The first side cushion 21 has a first head cushion part 31 that expands to cover one side of the head of the occupant 5 and a first torso cushion part 41 that expands to cover one side of the torso portion 5a (shoulder) of the occupant 5. The first head cushion part 31 stands upward at an angle facing backward from the front portion of the first torso cushion part 41.

The second side cushion 22 is located on the near side of the seat 1. The second side cushion 22 has the rear end thereof secured to the near side of the seat 1. The second side cushion 22 extends forward from the point of being secured to the seat 1 (see FIG. 1C). The second side cushion 22 has a second head cushion part 32 that expands to cover the other side of the head of the occupant 5 and a second torso cushion part 42 that expands to cover the other side of the torso portion 5a (shoulder to abdomen) of the occupant 5. The second head cushion part 32 stands upward at an angle facing backward from the front portion of the second torso cushion part 42.

The cushion connecting part 24 connects the rear part of the first side cushion 21 to the rear part of the second side cushion 22. The cushion connecting part 24 extends in the width direction of the seat 1 along the upper end surface of the backrest section 3, as depicted in FIG. 1B. One end of the cushion connecting part 24 opens into the first side cushion 21 and the other end of the cushion connecting part 24 opens into the second side cushion 22.

Regarding the vertical height position of the cushion connecting part 24, the cushion connecting part 24 is located in the upper height range of the seat 1. The "upper height range of the seat 1" refers to the range above the middle of the backrest section 3 in the vertical direction. In the present embodiment, the cushion connecting part 24 is located at the same height as the gap formed between the backrest section 3 and the headrest 4. The cushion connecting part 24 is thick enough to cover the area from the top of the backrest section 3 to the bottom of the headrest 4.

Regarding the position of the cushion connecting part 24 in the front-to-back direction, the cushion connecting part 24 is located in the front side region in the gap between the backrest section 3 and the headrest 4. The cushion connecting part 24 may be located further forward than the position depicted in FIG. 1C or in the rear side region in the gap between the backrest section 3 and the headrest 4. The cushion connecting part 24 may be provided through the support member 6 so that the cushion connecting part 24 spans the front and rear side regions in this gap. In this case, the through hole through which the support member 6 passes is separated from the flow channel of the duct by sewing or otherwise separating the edges of the through hole.

The airbag device 10 is further provided with a connecting member 26 as a connecting part connecting the first side cushion 21 and the second side cushion 22, as depicted in FIG. 1B, or the like. The connecting member 26 is a string or thin strip of material (for example, a tether). A base fabric contiguous with the airbag 11 or a fabric material (same material as the base fabric) connected to the airbag 11 can be used for the connecting member 26. For example, a non-stretchable material can be suitably used for the connecting member 26, but a stretchable material can also be used.

A first end 26a of the connecting member 26 is secured to the front part of the first side cushion 21 (for example, at or near the front end). A second end 26b of the connecting member 26 is secured to the front part of the second side cushion 22 (for example, at or near the front end). The "front part" of each side cushion 21 and 22 refers to the part that is more forward than the middle of each side cushion 21 and 22 in the front-to-back direction. In the present embodiment, each of the first end 26a and second end 26b are secured to the head cushion parts 31 and 32; however, they may also be secured to the torso cushion parts 41 and 42.

Figure 4:
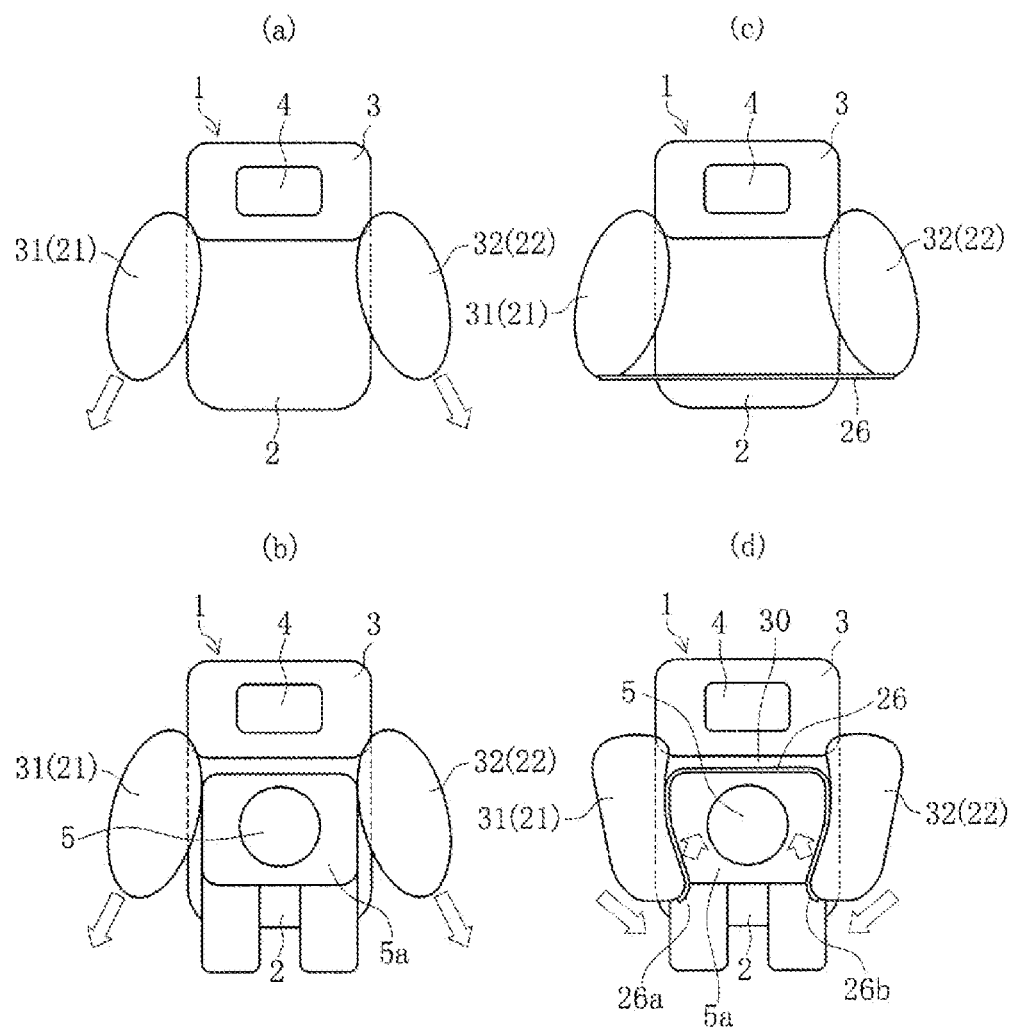
FIG. 4 is a schematic illustration of the seat viewed from above to describe the effect of the airbag according to Embodiment 1.

The connecting member 26 is deployed so as to pass through the rear surface region 30 between the seat 1 and the occupant 5 above the seat surface (top surface of the seat cushion 2) of the seat 1 (in the present embodiment, between the backrest section 3 and the torso portion 5a of the occupant 5) (see FIG. 4(d)). In the rear surface region 30, the connecting member 26 is located in the height range from the waist to the shoulder of the occupant 5 (for example, in the shoulder height range). Specifically, one end of the connecting member 26 passes between the inner surface of the first side cushion 21 and one side of the occupant 5, and ends between the backrest section 3 and the torso portion 5a of the occupant 5. The other end of the connecting member 26 passes between the inner surface of the second side cushion 21 and the other side of the occupant 5 and ends between the backrest section 3 and the torso portion 5a of the occupant 5. The center of the connecting member 26 runs through the rear surface region 30 from the far side to the near side of the occupant 5. As the airbag 11 expands and deploys, only a portion of the connecting member 26 needs to pass through the rear surface region 30, and some or all of the central portion of the connecting member 26 may stay within the seat 3 (for example, between the cushion material of the backrest section 3 and the cover (skin material) covering the cushion material).

Here, when the airbag 11 is expanded and deployed in the absence of the occupant 5, the connecting member 26 is stretched between the first end 26a and the second end 26b in the width direction of the seat 1 (see FIG. 4(c)). On the other hand, when the airbag 11 expands and deploys with the occupant 5 seated, the connecting member 26 passes through the rear surface region 30, so is not stretched in the width direction of the seat 1, but is held back by the back of the torso portion 5a of the occupant 5 (the connecting member 26 is attached to the occupant 5). This causes one end of the connecting member 26 to pull the first side cushion 21 inward diagonally backward. The other end of the connecting member 26 also pulls the second side cushion 22 inward diagonally backward. The securing points 21a and 22a of the connecting member 26 in each side cushion 21 and 22 are subjected to tensile force, and the area around the securing points 21a and 22a are slightly depressed (see FIG. 1A, and the like).

The length of the connecting member 26 is longer than the straight line distance from the securing point (connecting point) 21a of the connecting member 26 in the first side cushion 21 to the securing point (connecting point) 22a of the connecting member 26 in the second side cushion 22, for passing through the rear surface region 30.

[Airbag in a Spread Flat State]

Next, the configuration of the airbag 11 with the airbag 11 in a non-expanded state and in a state spread out on a flat surface (hereinafter called "spread flat state") will be described with reference to FIG. 2.

The airbag 11 is a bag configured by overlaying two cloths of the same shape and same size and sewing a prescribed location such as an outer periphery. In FIG. 2, the sewing points are represented by bold dashed lines. The airbag 11 has a horizontal rectangular shape, as depicted in FIG. 2. In the airbag 11 in the spread flat state, the longitudinal direction of the airbag 11 is referred to as the "left-right direction" and the short direction as the "front-to-back direction," and in the front-to-back direction, the side where each side cushion 21 and 22 is secured to the seat 1 (the upper side in FIG. 2) is referred to as the "rear side" and the opposite side as the "front side." The upper side of the airbag 11 is the rear side, even in the fully expanded state, as depicted in FIG. 2. In FIG. 2, the upper side of the diagram is called the "front side", and the lower side of the diagram is called the "back side". Each side cushion 21 and 22 becomes the outer side of the cushion with the upper side of the diagram in the fully expanded state and the inner side (occupant 5 side) with the lower side of the diagram in the fully expanded state, and for the cushion connecting part 24, the upper side of the diagram becomes the upper side even in the fully expanded state and the lower side of the diagram becomes the lower side even in the fully expanded state.

The airbag 11 has a cushion connecting part 24 extending in the left-right direction, a first side cushion 21 connected to one end of the cushion connecting part 24, and a second side cushion 22 connected to the other end of the cushion connecting part 24. A connecting member 26 that connects the first side cushion 21 and the second side cushion 22 together is located on the rear surface of the airbag 11.

The cushion connecting part 24 has a horizontal rectangular shape. The cushion connecting part 24 is located on the rear side of the airbag 11. The front end of the cushion connecting part 24 (in FIG. 2, the location of the horizontal slit 35) is located rearward of the front end of each of the first and second side cushions 21 and 22. The front-to-back direction dimension (thickness) of the cushion connecting part 24 is less than half the front-to-back direction dimension of each side cushion 21 and 22.

The first side cushion 21 has a first torso cushion part 41 positioned outside the cushion connecting part 24 in the left-right direction and a first head cushion part 31 positioned forward of the cushion connecting part 24. The first torso cushion part 41 extends forward from the front end of the cushion connecting part 24. The first head cushion part 31 extends inward in the left-right direction (to the right in FIG. 2) from the portion of the first torso cushion part 41 that extends forward.

The first head cushion part 31 has a substantially rectangular shape. The first head cushion part 31 is adjacent to the cushion connecting part 24 via the transverse slit 35 described above. The first torso cushion part 41 part has a slightly longitudinal, rectangular shape. The first torso cushion part 41 is for protecting the side of the shoulder of the occupant 5. In the present specification, "rectangle" includes a square.

The second side cushion 22 has a second torso cushion part 42 positioned outside the cushion connecting part 24 in the left-right direction and a second head cushion part 32 positioned in front part of the cushion connecting part 24. The second torso cushion part 42 extends forward of the front end of the cushion connecting part 24. The second head cushion part 32 extends inward in the left-right direction (to the left in FIG. 2) from the portion of the second torso cushion part 42 that extends forward.

The second head cushion part 32 has a substantially rectangular shape. The second head cushion part 32 is adjacent to the cushion connecting part 24 via a transverse slit 35 extending in the left-right direction. The second torso cushion part 42 has a horizontal rectangular shape. Strictly speaking, the second torso cushion part 42 is the outer portion in the left-right direction, and the dimensions thereof in the front-to-back direction gradually shorten as it approaches the outer end. The portion on the side of the cushion connecting part 24 in the second torso cushion part 42 constitutes the upper cushion part 42a for protecting the side of the shoulder of the occupant 5. The portion opposite the cushion connecting part 24 in the second torso cushion part 42 constitutes the lower cushion part 42b for protecting the chest and the side of the abdomen of the occupant 5.

A stowing part 45 for the inflator 12 is formed at the rear part of the second torso cushion part 42. A gas guide 18 is provided in the stowing part 45. The gas guide 18 has a first outlet 18a that opens to the upper cushion part 42a and a second outlet 18b that opens to the lower cushion part 42b as an outlet for the gas injected from the inflator 12. In the present embodiment, in the event of a near side collision, the second torso cushion part 42, which has less time to protect the occupant 5 from the collision, can be expanded and deployed ahead of the other cushion parts.

The first head cushion part 31 and the second head cushion part 32 are adjacent to each other at their tips via a longitudinal slit 36 that extends in the front-to-back direction. The first head cushion part 31 and the second head cushion part 32 are symmetrically formed across the vertical slit 36. The longitudinal slit 36 is a cut extending from the front end of the airbag 11 in the front-to-back direction and connects to the center position of the transverse slit 35 on the rear side. A horizontal slit 35 extends from the back end of the vertical slits 36 to the left and right, respectively. The horizontal slit 35 and vertical slit 36 together form a substantially T-shaped cut. In the present embodiment, each slit 35 and 36 are incisions with almost no gap, however, may also be incisions with some gap present.

Figure 2:
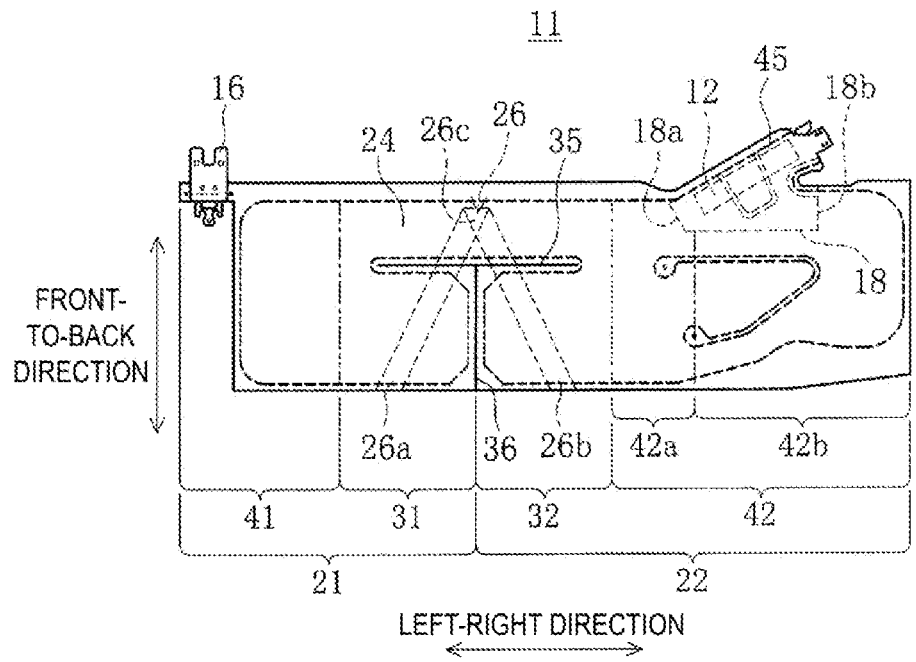
FIG. 2 is a plan view of an airbag in a spread flat state in the airbag device according to Embodiment 1.

As depicted in FIG. 2, the first end 26a of the connecting member 26 is secured to the front end of the first head cushion part 31 by sewing or other means. The second end 26b of the connecting member 26 is secured to the front end part of the second head cushion part 32 by sewing or other means. The connecting member 26 is overlaid on the rear surface of the airbag 11 with a sharply bent angle at one point. The connecting member 26 extends straight up at an angle on the right side from the first end 26a to a bend 26c on the rear surface of the cushion connecting part 24. Then, the connecting member 26 extends straight down from that bend 26c diagonally on the right side to the second end 26b. The connecting member 26 has bilateral symmetry. The connecting member 26 may be folded over the airbag 11 in two or more places.

The airbag 11 has a tab 16 as a securing part for securing the airbag 11 to the seatback frame 3a of the seat 1. The tab 16 is attached to the rear portion of the outer circumference of airbag 11. In the present embodiment, the tab 16 is provided at the outer end (left end in FIG. 2) of the first side cushion 21. The location and number of tabs 16 on the airbag 11 are not limited to the present embodiment.

[Airbags and the Like Inside the Seat in Stowed Condition]

The stowed state in which the airbag 11 is stowed in the seat 1 is then explained with reference to FIG. 3.

The airbag 11 is folded so that the front-to-back dimension thereof in the spread flat state becomes shorter, which is the stowing configuration when stowed in the seat 1. The connecting member 26 folds together with the airbag 11. The airbag 11 can be folded by, for example, rolling it from the front side to the rear side. Other methods of folding the airbag 11, such as a bellows shape folding method, may be used.

Figure 3:
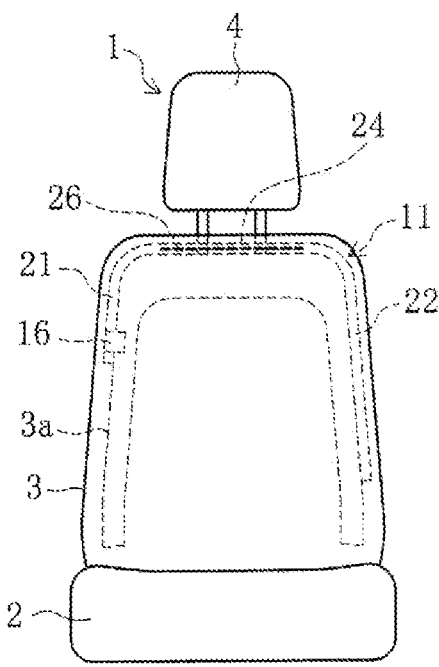
FIG. 3 is a front view of the seat depicting the stowed state of the airbag according to Embodiment 1.

The airbag 11 in the stowed form thereof is stowed in the seat 1 in a folded position along the seatback frame 3a, as depicted in FIG. 3. The cushion connecting part 24 and connecting member 26 are stowed in the upper end of backrest section 3, the first side cushion 21 is stowed on the far side of the seat 1, and the second side cushion 22 is stowed on the near side of the seat 1.

The airbag 11 in the stowed condition stowed in the seat 1 is secured to the seat back frame 3a of the seat 1 at two points: at the tab 16 and at the stowing part 45 of the inflator 12. Specifically, tab 16 secures the first torso cushion part 41 to the seat back frame 3a. The stowing part 45 has a hole for insertion of a stud bolt protruding from the inflator 12 (not depicted). As the inflator 12 is secured to the seat back frame 3a with stud bolts, the stowing part 45 with stud bolts through the insertion holes is also secured to the seat back frame 3a.

[Operation of the Airbag Device]

The operation of the airbag device 10 is described below.

When the vehicle is impacted by a collision or rollover, the inflator 12 receives a signal from the sensor and injects gas into the second side cushion 22. This causes the second side cushion 22 to expand and deploy. A portion of the gas injected into the second side cushion 22 is supplied to the first side cushion 21 through the cushion connecting part 24. This causes the first side cushion 21 to expand and deploy. In the present embodiment, one inflator 12 causes both side cushions 21 and 22 to be in a fully expanded state.

Here, when a side collision of a vehicle occurs, in the initial stage of the collision, the occupant 5 moves to the side where the collision occurs due to inertial forces, and then moves to the opposite side due to the impact force of the collision. Specifically, in the case of a far-side side impact, the occupant 5 is struck by the first side cushion 21 in the early stages of the crash. And with this collision, the second side cushion 22 connected via the cushion connecting part 24, along with the first side cushion 21, also moves to the far side. When the occupant 5 then moves to the opposite side from the initial impact, the occupant 5 impacts the second side cushion 22. On the other hand, in the case of a near-side side impact, the occupant 5 hits the second side cushion 22 in the early stages of the impact, causing the second side cushion 22 and the first side cushion 21 to move toward the near side. When the occupant 5 then moves to the opposite side from the initial impact, the occupant 5 impacts the first side cushion 21.

[Effects of Embodiment 1]

In the present embodiment, although one of the side cushions 21 and 22 on the side where the collision occurs moves outward in the early stages of the collision under the collision load of the occupant 5, the one of the side cushions is held back to some extent by the cushion connecting part 24, and the amount of outward movement of the seat 1 is suppressed. The occupant 5 is restrained at an early stage by the side where the collision occurs. As one of the side cushions 21 and 22 moves outward, the other of the side cushions 21 and 22 is pulled laterally through the cushion connecting part 24 to the occupant 5 side. Therefore, the distance traveled by the occupant 5 moving to the opposite side from the side where the collision occurs until they collide with the other side cushions 21 and 22 is shortened. The occupant 5 is also restrained at an early stage by the side opposite to where the collision occurs. Thus, each side cushion 21 and 22 provides excellent restraint performance against side impact.

In the present embodiment, the cushion connecting part 24 is positioned near the height range (shoulder height range) where the occupant 5 impacts the side cushions 21 and 22 in the early stages of the crash. Therefore, lateral loads are easily transmitted through the cushion connecting part 24. The side cushions 21 and 22 have excellent unity of behavior and excellent restraint performance against side impact.

Note that when the vehicle rolls over, the occupant 5 moves to the left or right as the vehicle rotates. In this case, the airbag device 10 can still restrain the occupant 5 at an early stage because the side cushions 21 and 22 on both sides behave in unison.

In the present embodiment, the connecting member 26 connecting the first side cushion 21 and the second side cushion 22 deploys as the airbag 11 expands and deploys to pass through the rear surface region 30 described above, as depicted in FIG. 4(d). Therefore, the connecting member 26 is pushed and held in place by the occupant 5, pulling each side cushion 21 and 22 inward. In particular, in the present embodiment, the connecting member 26 is held in place by the torso portion 5a of the occupant 5, which pulls each side cushion 21 and 22 to a large extent.

Here, each side cushion 21 and 22 expands and develops diagonally outward (in the direction of the arrow) from each side of the backrest section 3, as depicted in FIG. 4(a) and FIG. 4(b), when the connecting member 26 is not provided. In this case, the front of each side cushion 21 and 22 would be separated from the occupant 5. In contrast, in the present embodiment, the connecting member 26 pulls each side cushion 21 and 22 inward, as depicted in FIG. 4(d). Therefore, each side cushion 21 and 22 comes closer to the occupant 5, and the degree of adhesion (contact area) of each side cushion 21 and 22 to the occupant 5 increases. This form of restraint allows for even earlier restraint of the occupants on both sides of the occupant 5.

In particular, in the present embodiment, the connecting member 26 connects the front part of the first side cushion 21 to the front part of the second side cushion 22 in the fully expanded state. The connecting points 21a and 22a of the connecting members 26 in each side cushion 21 and 22 are both positioned forward of the torso portion 5a and head of the occupant 5 in the front-rear direction. Therefore, each side cushion 21 and 22 is drawn to cover the torso portion 5a and head of the occupant 5 from the diagonally forward side. Therefore, excellent restraint performance can be provided even when the occupant 5 moves diagonally forward due to a collision at an oblique forward angle to the occupant 5.

In the present embodiment, the connecting member 26 passes through the rear surface region 30 from the side of one side of the occupant 5 to the side of the other side of the occupant 5 in the fully expanded state, thus extending the area of the connecting member 26 that is held down by the occupant 5. Therefore, each side cushion 21 and 22 can be securely pulled inward regardless of the seating position and posture of the occupant 5.

In the present embodiment, the connecting member 26 is folded and stowed in the seat 1 with the cushion connecting part 24 overlapped on the side (rear surface in FIG. 2) that is the lower side in the fully expanded state. Therefore, when the airbag 11 is expanded and deployed, the connecting member 26 is pushed downward, which ensures that the connecting member 26 passes through the rear surface region 30 and pulls each side cushion 21 and 22 inward.

Incidentally, conventional airbag configurations to protect occupants against side impact include a curtain airbag to protect the head of the occupant in a near side impact, a near side airbag to protect the torso of the occupant in a near side impact, and a far side airbag to protect the head of the occupant in a far side impact. In some cases, each of these airbags may be provided. On the other hand, in the future, airbag devices will be required to be compatible with automated driving. In automatic operation, it is assumed that the occupant will tilt the backrest of the seat backward to assume a comfortable position, or the occupant will switch the seat orientation between the front and rear part of the vehicle. However, in order to make the conventional airbag configuration described above compatible with automatic driving, the protective range of each airbag must be extended, which poses challenges in terms of cost and design.

In contrast, in the present embodiment, the size of each side cushion 21 and 22 can be downsized because the occupant 5 can be restrained at an early stage, and the inflator 12 can also be downsized, thus improving the packageability of the airbag device 10. Furthermore, the airbag 11 can be configured with a good design due to the miniaturization of each side cushion 21 and 22. In addition, the curtain airbag can be omitted because the second side cushion 22 provides protection from the head to the abdomen of the occupant 5. This eliminates the need to mount the airbags on the roof of the vehicle and increases the flexibility of the vehicle layout. Furthermore, the cost and weight can be reduced compared to providing separate side cushions on each side of the seat 1.

When the seatbelt is crossed over the torso portion 5a of the occupant 5 at an angle downward from the near-side side to the far-side side, the second side cushion 22 is interposed between the seatbelt and the occupant 5 in the fully expanded state. Therefore, while the reaction surface of the side cushion 22 on the near-side side is the vehicle trim in a conventional airbag configuration described above, the reaction surface here is the seat belt. Thus, the occupant 5 can be restrained early on the near-side side.

The airbag device 10 can be installed in any of the front and rear seats of a vehicle, or in a single-seat vehicle. Since the airbag device 10 is not dependent on the vehicle layout, some or all of the airbag device 10 may be modularized to be applied to multiple vehicle models.

[First Variation of Embodiment 1]

Figure 5:
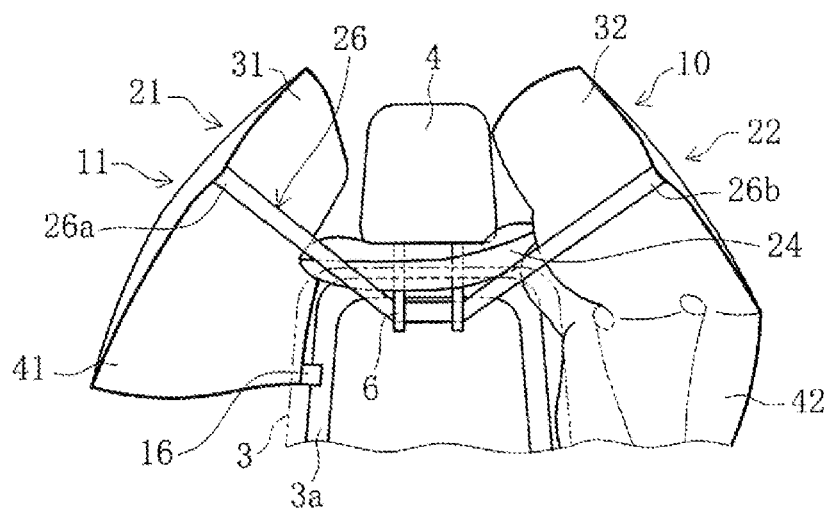
FIG. 5(a) is a diagram of the airbag device according to the first modified example of Embodiment 1, showing the interior and the like of the airbag in a fully expanded state, the connecting member, and the backrest section.
FIG. 5(b) is a diagram of the connecting part with a different configuration to that of FIG. 5(a).
Figure 5:
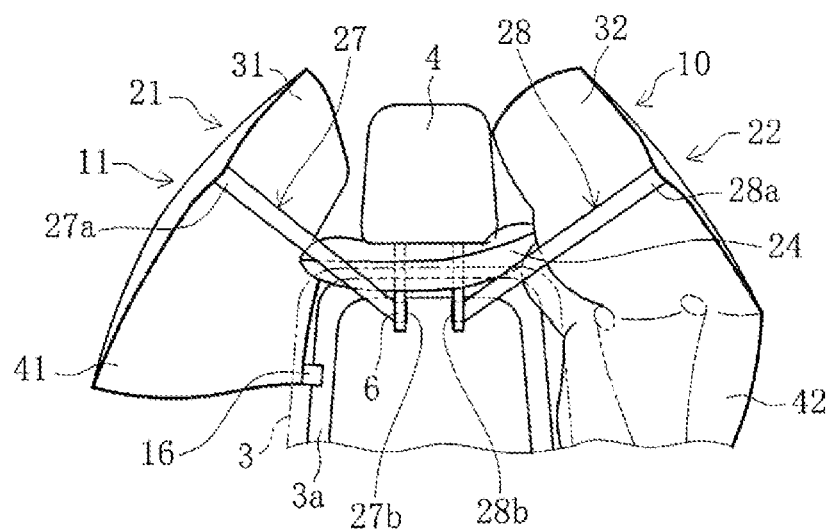

In the present variation, the connecting member 26 partially passes through the interior of the seat 5 in the fully expanded state, as depicted in FIG. 5(a). In FIG. 5(a), the cushion is omitted for the backrest section 3 and the internal structure is described. This is also true for FIG. 5(b).

In the fully expanded state, one end of the connecting member 26 extends inward diagonally backward from the first end 26a secured to the first side cushion 21 and penetrates from the front part of the cushion of the backrest section 3 to the interior. The other end of the connecting member 26 extends inward diagonally backward from the second end 26b secured to the second side cushion 22 and penetrates into the interior from the front part of the cushion of the backrest section 3. Inside the backrest section 3, the connecting member 26 passes behind the two support members 6 secured to the seat back frame 3a and is hooked to the two support members 6. The connecting member 26 may be secured to the support member 6 so as not to move to the left or right, or may just be hooked to the support member 6 so as to be able to move to the left or right.

In the present variation, the rear side of the portion of the connecting member 26 that protrudes from the front part of the cushion of the backrest section 3 and extends to each side cushion 21 and 22 passes through the rear surface region 30 between the seat 1 and the occupant 5 above the seat surface of the seat 1. In the rear surface region 30, the connecting member 26 is located in a height range from the waist to the shoulder of the occupant 5. Therefore, as in Embodiment 1, the connecting member 26 is pushed and held in place by the occupant 5, pulling each side cushion 21 and 22 inward. Therefore, the occupant 5 can be restrained from both sides at an early stage. Since the connecting member 26 is hooked to the support member 6, the occupant 5 is not pushed forward by the connecting member 26 when unfolding from the stowed state, thereby preventing the occupant 5 from moving forward in the event of a frontal collision.

As depicted in FIG. 5(b), the portion between the two support members 6 may be omitted from the connecting member 26. In other words, the connecting part may be composed of a first member 27 with a first end 27a connected to the first side cushion 21 and a second end 27b connected to the support member 6, and a second member 28 with a first end 28a connected to the second side cushion 22 and a second end 28b connected to the support member 6. The connecting part will connect the first side cushion 21 and the second side cushion 22 via the seat back frame 3a of the seat 1. Again, because the rear side of the portion of the backrest section 3 that protrudes from the front part of the cushion and extends to each side cushion 21 and 22 passes through the rear surface region 30, the connecting member 26 is held back by the occupant 5, pulling each side cushion 21 and 22 inward.

The member that hooks the connecting member 26 in FIG. 5(a) and the member that fixes each member 27, 28 in FIG. 5(b) may be any member secured to the seat back frame 3a, and a member other than the support member 6 (for example, tab, spring member, and the like) may be selected.

[Second Variation of Embodiment 1]

Figure 6A:
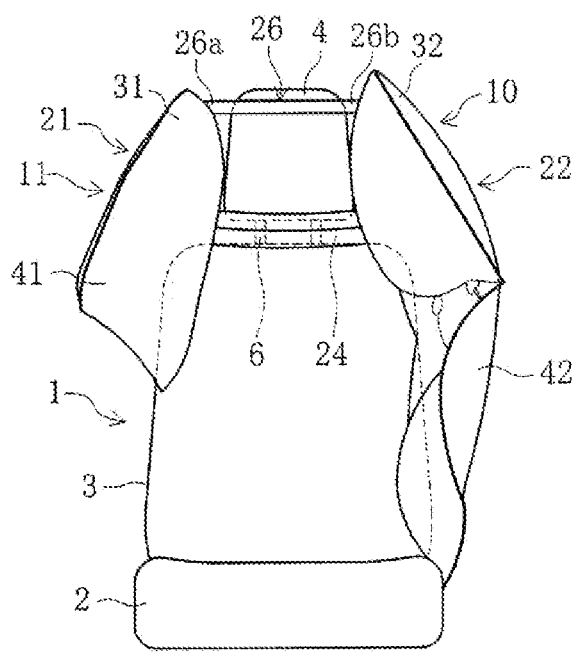
FIG. 6A is a diagram depicting an airbag in a fully expanded state of the airbag device according to the second modified example of Embodiment 1, viewed from the front with no occupant in the seat.
Figure 6B:
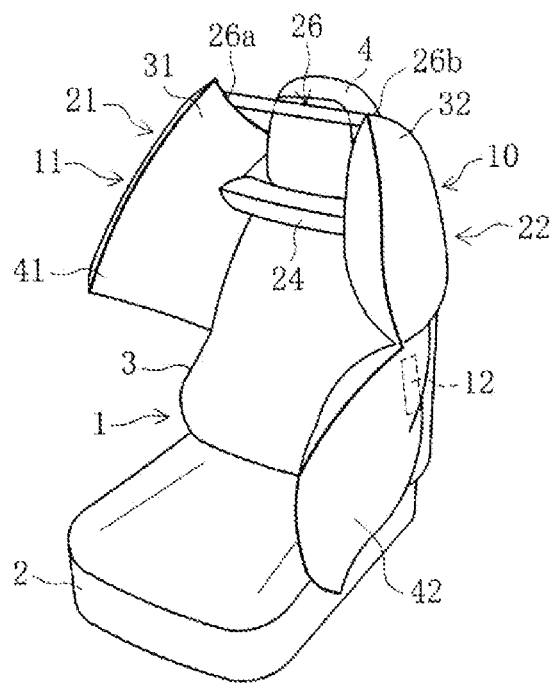
FIG. 6B is a diagram depicting an airbag in a fully expanded state, viewed obliquely from the front on the second side cushion side with no occupant in the seat.

In the present variation, the securing points of each end 26a and 26b of the connecting member 26 are different from those in Embodiment 1. Specifically, the first end 26a of the connecting member 26 is secured to the top (for example, at or near the top) of the first head cushion part 31 in the fully expanded state, as depicted in FIGS. 6a and 6b. The second end 26b of the connecting member 26 is secured to the top (for example, at or near the top) of the second head cushion part 32 in the fully expanded state. In this variation, each of the first end 26a and the second end 26b is secured to the center of each head cushion part 31, 32 in the front-to-back direction, but may be secured to the front or rear.

Figure 7:
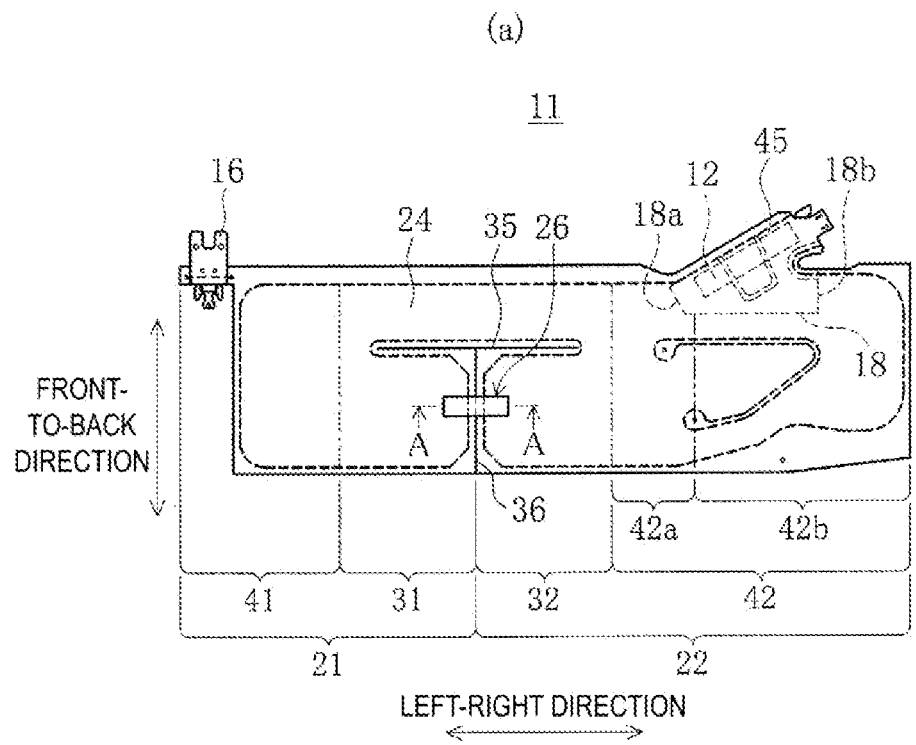
FIG. 7(a) is a plan view of an airbag in a spread flat state of the airbag device according to the second modified example of Embodiment 1.
FIG. 7(b) is a cross section view taken along line A-A in FIG. 7(a).
Figure 7:
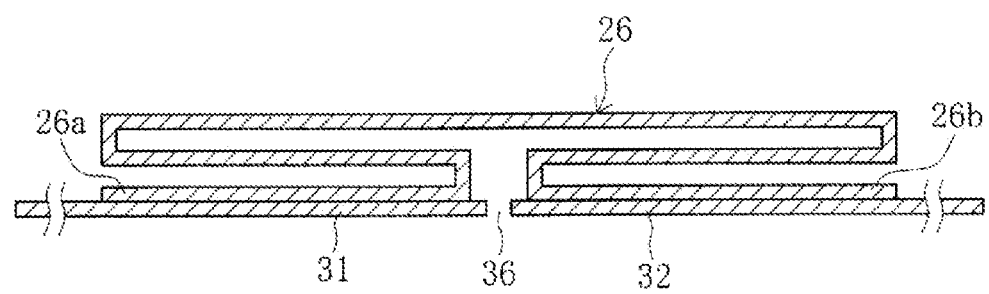

In the airbag 11 in the spread flat state, the connecting member 26 is overlaid on the front side of the airbag 11, as depicted in FIG. 7(a). As depicted in FIG. 7(b), the connecting member 26 is folded at several points in the length direction, and each end 26a, 26b is secured to each head cushion part 31, 32.

In the present variation, the connecting member 26 is deployed so as to pass through the rear surface region 30 in the fully expanded state (in the present embodiment, the connecting member passes between the headrest 4 and the head of the occupant 5). In the rear surface region 30, the connecting member 26 is positioned in the head height range of the occupant 5. Therefore, the connecting member 26 is held in place by the back of the head of the occupant 5 or other parts of the body thereof, pulling each side cushion 21 and 22 inward. In the present variation, each head cushion part 31 and 32 in particular is drawn inward.

[Third Variation of Embodiment 1]

Figure 8:
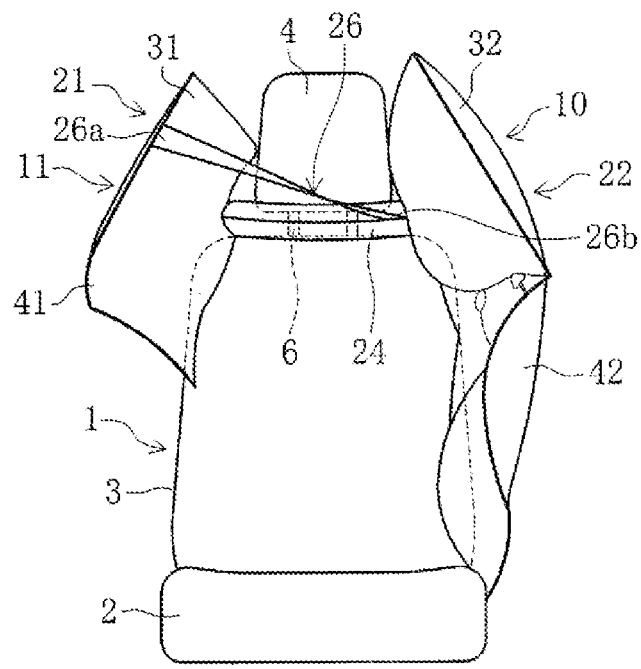
FIG. 8 is a diagram depicting an airbag in a fully expanded state of the airbag device according to the third modified example of Embodiment 1, viewed from the front with no occupant in the seat.

In the present variation, the securing points of each end 26a and 26b of the connecting member 26 are different from those in Embodiment 1. Specifically, the first end 26a of the connecting member 26 is secured to the front part of the first head cushion part 31 (for example, at or near the front end) in the fully expanded state, as depicted in FIG. 8. The second end 26b of the connecting member 26 is secured to the second side cushion 22 side of the cushion connecting part 24 in the fully expanded state.

Figure 9:
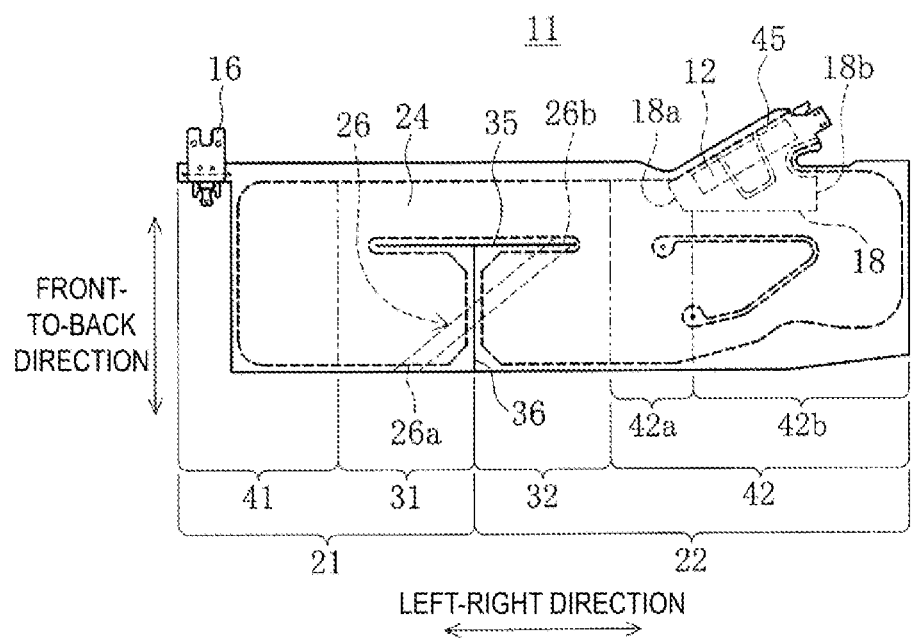
FIG. 9 is a plan view of an airbag in a spread flat state of the airbag device according to the third modified example of Embodiment 1.

In the airbag 11 in the spread flat state, the connecting member 26 is overlaid on the rear surface of the airbag 11, as depicted in FIG. 9. A first end 26a of the connecting member 26 is secured to the front end of the first head cushion part 31. The second end 26b of the connecting member 26 is secured to the second side cushion 22 side at the front end part of the cushion connecting part 24.

In the present variation, the connecting member 26 is deployed so as to pass through the rear surface region 30. In the rear surface region 30, the connecting member 26 is located in a height range from the shoulder to the head of the occupant 5. Therefore, the connecting member 26 is pushed and held by the occupant 5, which pulls the first side cushion 21 inward.

A first end 26a of the connecting member 26 may be secured to the front part of the first torso cushion part 41. The second end 26b of the connecting member 26 may be secured to the rear part of the second side cushion 22 instead of the cushion connecting part 24.

In the fully expanded state, the first end 26a of the connecting member 26 may be secured to the front part of the second side cushion 22 and the second end 26b of the connecting member 26 may be secured to the first side cushion 22 side or the rear part of the first side cushion 21 in the cushion connecting part 24.

Embodiment 2

Unlike Embodiment 1, the airbag device 60 according to the present embodiment differs from Embodiment 1 in that there is no cushion connecting part 24 between the first side cushion 71 and the second side cushion 72, and the first and second side cushions 71 and 72 are separate units. Each side cushion 71 and 72 has an inflator 12. The first side cushion 71 is on the far side and the second side cushion 72 is on the near side. In the following, since the first side cushion 71 and the second side cushion 72 are symmetrically formed, both side cushions 71 and 72 are described together.

[Side Cushion in a Fully Expanded State]

Figure 10:
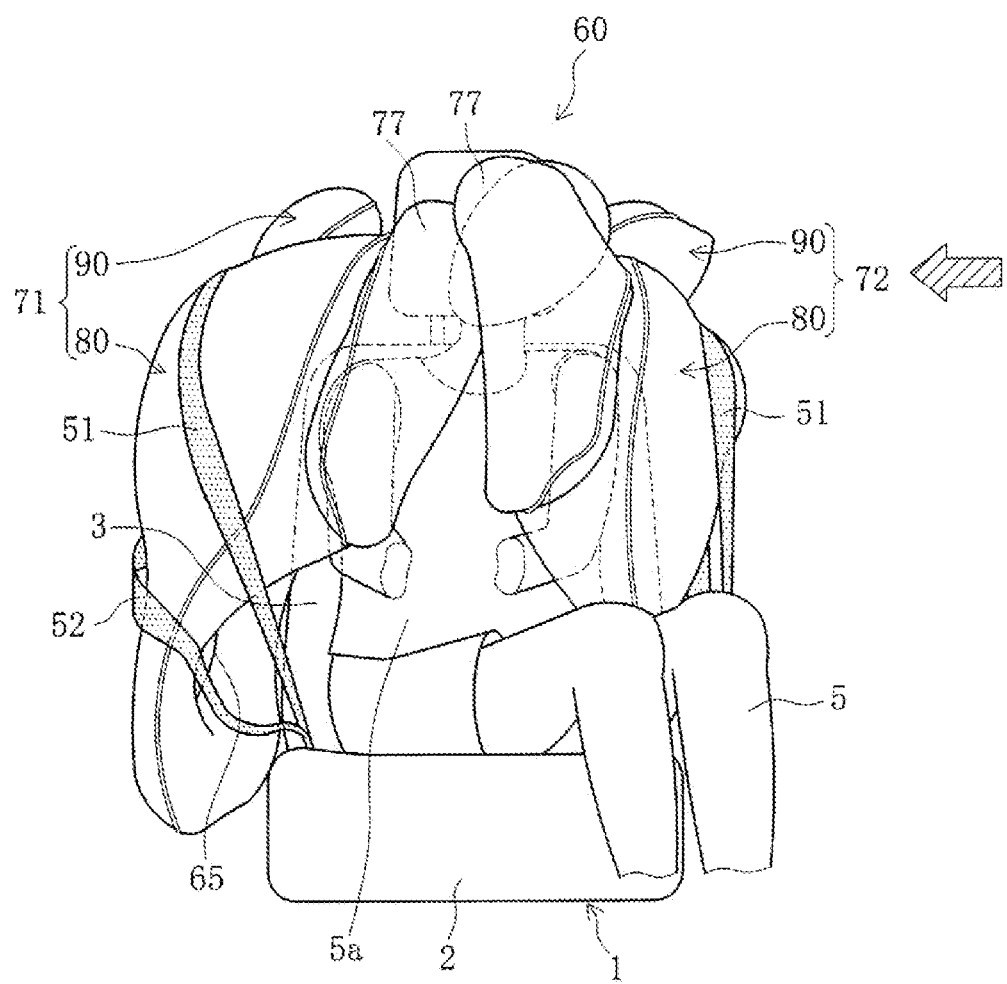
FIG. 10 is a diagram depicting an airbag in a fully expanded state of the airbag device according to Embodiment 2, viewed from the front with an occupant in the seat.

The side cushions 71 and 72 in the fully expanded state are explained with reference to FIG. 10. FIG. 10 depicts the immediate aftermath of the collision from the near-side side (right side of FIG. 10) in the direction of the arrow.

Each of the side cushions 71 and 72 has a torso cushion part 80 covering the torso portion 5a of the occupant 5 from the side, a head cushion part 90 integrated with the torso cushion 80 and covering the head of the occupant 5, and a forward protecting cushion part 77 attached to the front of the torso cushion part 80. The forward protecting cushion part 77 can be omitted.

The rear end of the torso cushion part 80 is secured to the side of the seat 1. The torso cushion part 80 extends forward from the point of being secured to the seat 1. The torso cushion part 80 has a thickness suppressing part 65 for suppressing the thickness of the torso cushion part 80 in the region facing the upper arm of the occupant 5 in a state extending diagonally down from the shoulder (grasping the steering wheel). The thickness suppressing part 65 is a through hole. The thickness suppressing part 65 may be configured by a recess. The thickness suppressing part 65 does not need to be formed on the torso cushion part 80.

The head cushion part 90 is located above the cushion part 80 for the torso. The head cushion part 90 is smaller than the torso cushion part 80. The forward protecting cushion part 77 is connected to the front inner surface of the torso cushion part 80. The forward protecting cushion part 77 is formed in a longitudinal shape. The pair of forward protecting cushion parts 77 expand and deploy to close the gap between the pair of torso cushion parts 80 (front side gap).

[Side Cushion in a Spread Flat State]

Next, the unexpanded side cushions 71 and 72 are unfolded and laid flat on a surface (hereinafter referred to as the "spread flat state") and the configuration of these side cushions 71 and 72 are described below with reference to FIG. 11.

In the description of the side cushions 71 and 72 in the spread flat state, the forward protecting cushion part 77 side, which is the front side in the fully expanded state, is referred to as "interior", and the inflator 12 side, which is the rear side in the fully expanded state, is referred to as "exterior". The side that will be the occupant 5 side in the fully expanded state is called the "back side" and the opposite side is called the "front side". FIG. 11 depicts a view of the pair of side cushions 71 and 72 from the back side. In FIG. 11, the bold dashed line represents the sewing points. However, in FIG. 11, the sewn areas covered by the belt 51, 52 or the forward protecting cushion part 77 are represented by thin dashed lines.

Each side cushion 71 and 72 is a bag composed of two base fabrics of the same shape and size stacked on top of each other and sewn at predetermined points, such as the outer circumference. Each of the side cushions 71 and 72 has a torso cushion part 80 with a thickness suppressing part 65 formed at an outer position, a head cushion part 90 integrated into the torso cushion part 80, and a forward protecting cushion part 77 overlapped on the back surface of the inner portion of the torso cushion part 80.

The torso cushion part 80 extends diagonally upward from the outside to the inside. The torso cushion part 80 has a thickness suppressing part 65 in the form of an island surrounded by an area that expands due to the expansion gas.

On the outside of the torso cushion part 80, there is a stowing part 45 for the inflator 12. The gas guide 18 is housed inside the upper part of the outer portion in the torso cushion part 80. The gas guide 18 is secured to the torso cushion part 80 at the periphery of the thickness suppression part 65. The torso cushion part 80 has an upper flow channel for the expansion gas from the inflator 12 to flow through the upper portion of the thickness suppressing part 65 to the front portion of the thickness suppressing part 65 and a lower flow channel for the expansion gas to flow through the rear portion of the thickness suppressing part 65 to the lower portion of the thickness suppressing part 65.

The head cushion part 90 is connected to the torso cushion part 80 at a position above the thickness suppression part 65. The head cushion part 90 extends inward along the upper end of the torso cushion part 80 from the head flow channel 90a side that connects to the torso cushion part 80. In the side cushions 71 and 72, a non-expanded seat part 91 is provided inside the head channel 90a.

The forward protecting cushion part 77 is joined to the torso cushion part 80 by, for example, an elliptical joint 29. The forward protecting cushion part 77 is connected to the torso cushion part 80 through a plurality of connecting parts 25 in the joint 29. Each of the connecting parts 25 consists of a vent hole.

Here, the airbag device 60 is further provided with a first belt 51 and a second belt 52 that restrain the torso cushion part 80 from the outside in the fully expanded state. Each belt 51 and 52 is provided across the first side cushion 71 and the second side cushion 72. In FIG. 10, each belt 51 and 52 is depicted with a dot-hatched line.

Each side cushion 71 and 72 has an insertion part 55 through which the belts 51 and 52 are inserted. Each of the belts 51 and 52 are inserted into the respective insertion portions 55 so as to pass through the rear surface of the head cushion part 90 and through the front side of the torso cushion part 80. Each of the belts 51 are 52 are secured to the surface side of the torso cushion part 80, for example, by means of the securing parts 51a and 52a. With the two belts 51 and 52, a first end of the belt 51 and a first end of the belt 52 are joined to form the first coupling 50a, and a second end of the belt 51 and a second end of the belt 52 are joined to form the second coupling 50b. Each coupling 50a and 50b is secured to the seat 1.

Figure 11:
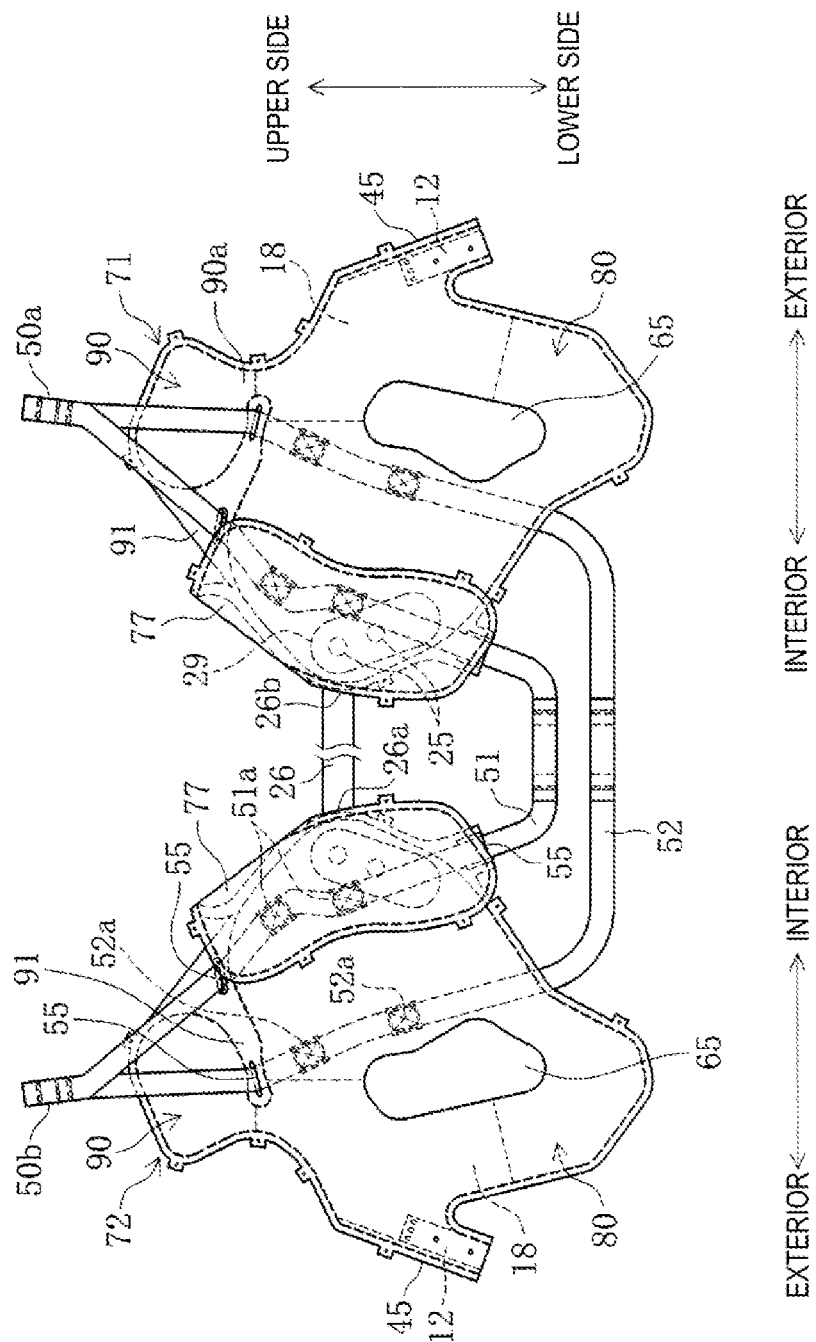
FIG. 11 is a plan view of an airbag in a spread flat state in the airbag device according to Embodiment 2.

As depicted in FIG. 11, the airbag device 10 further has a connecting member 26 as a connecting part connecting the first side cushion 71 and the second side cushion 72. A first end 26a of the connecting member 26 is secured to the front part of the first side cushion 71 (for example, at or near the front end). Specifically, the first end 26a is secured to the forward protecting cushion part 77. Meanwhile, the second end 26b of the connecting member 26 is secured to the front part of the second side cushion 72 (for example, at or near the front end). The second end 26b is secured to the forward protecting cushion part 77. The connecting member 26 is deployed so as to pass through the rear surface region 30 between the seat 1 and the occupant 5 above the seat surface of the seat 1 (see FIG. 12(b)). Each end 26a and 26b of the connecting member 26 may be secured to a location other than the forward protecting cushion part 77 (such as the torso cushion part 80).

[The Condition of Side Cushions and the Like Stowed in the Seat]

Each side cushion 71 and 72 is folded and stowed in the side of the backrest section 3 of the seat 1 (not depicted). When stowing each side cushion 71 and 72 in the backrest section 3, the rear end of each side cushion 71 and 72 is secured to the seat back frame 3a using tabs or other fasteners (not depicted). Each side cushion 71 and 72 is secured to the seat back frame 3a in each of the stowing parts 45, as in Embodiment 1. The connecting member 26 is stowed inside the backrest section 3, extending between the two sides.

The two belts 51 and 52 have their respective couplings 50a and 50b secured to the left and right support members 6 (or the upper end of the seat back frame 3a), respectively. The space between the couplings 50a and 50b in each of the belts 51 and 52 extends along the longitudinal frame of the seat back frame 3a and passes inside (or under) the seat cushion 2. Each belt 51, 52 is not secured to the seat cushion 2.

[Effects of Embodiment 2]

Figure 12:
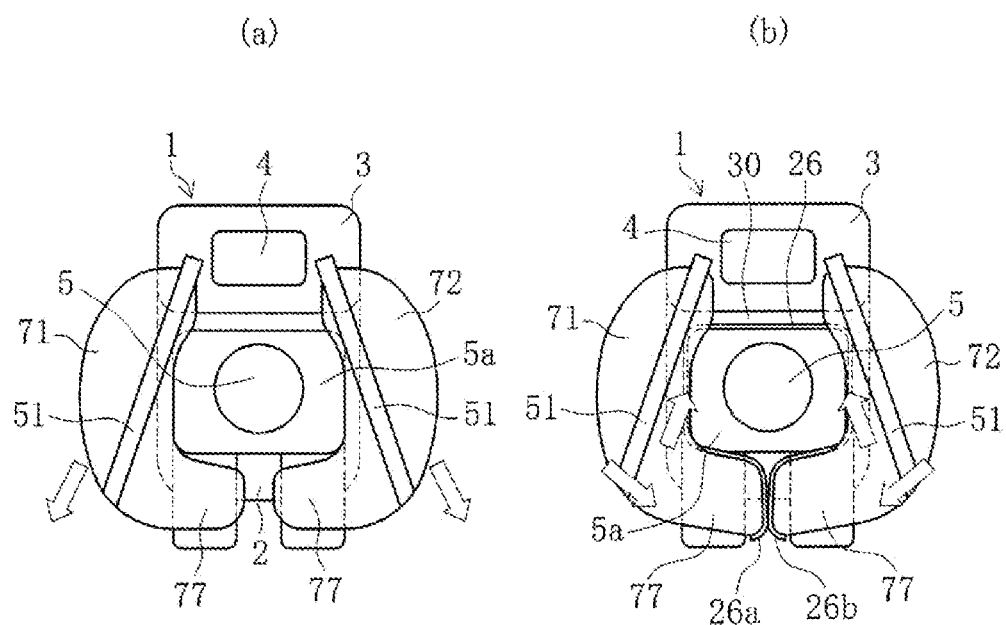
FIG. 12 is a schematic illustration of the seat viewed from above for describing the effect of the airbag according to Embodiment 2.

When the vehicle is impacted by a collision or rollover, each side cushion 71 and 72 expands and deploys as each inflator 12 injects gas upon receiving a signal from the sensor. At that time, the connecting member 26 deploys as the respective side cushions 71 and 72 expand and deploy so as to pass through the rear surface region 30, as depicted in FIG. 12(b). In the rear surface region 30, the connecting member 26 is located in a height range from the waist to the shoulder of the occupant 5. Therefore, the connecting member 26 is pushed and held in place by the occupant 5, pulling each side cushion 71 and 72 inward.

Here, when the connecting member 26 is not provided, as depicted in FIG. 12(a), the pair of forward protecting cushion parts 77 expand and deploy to close the gap forward of the occupant 5, but a gap remains to some extent. In contrast, in the present embodiment, the connecting member 26 draws each side cushion 71 and 72 inward, narrowing the gap between the pair of forward protecting cushion parts 77. This prevents the occupant 5 from slipping forward and improves the restraint performance against frontal collision. Since the degree of adhesion of each side cushion 71 and 72 to the occupant 5 is increased, the restraint performance against side collision can also be improved.

Other Variations

In Embodiment 1 above, the cushion connecting part 24 connecting the first side cushion 21 and the second side cushion 22 was a duct, but the cushion connecting part 24 may be a member that does not allow gas to flow inside. In this case, for example, a second inflator can be attached to the first side cushion 21.

In Embodiments 1 and 2 above, a string or thin strip of material is used for the connecting member 26, but a wide, strip-shaped fabric material may also be used.

In Embodiments 1 and 2 above, the connecting member 26 passes through a height at or near the shoulder of the occupant 5 in the rear surface region 30, but may also pass through at a height of the waist of the occupant 5.

INDUSTRIAL APPLICABILITY

The present invention is applicable to airbag devices and the like that protect the side of occupants and the like.

EXPLANATION OF CODES

1. Seat
5. Occupant
10. Airbag device
11. Airbag
12. Inflator
21. First side cushion
22. Second side cushion
24. Cushion connecting part
26. Connecting member
26a. First end
26b. Second end
30. Rear surface region

The invention claimed is:

1. An airbag device, comprising:
a first side cushion that expands and deploys forward to cover one side of an occupant seated in a vehicle seat;
a second side cushion that expands and deploys forward to cover the other side of the occupant;
at least one inflator that injects gas to inflate the first and second side cushions; and
a connecting part connecting the first side cushion to the second side cushion, wherein
the connecting part expands so as to pass through the rear surface region between the seat and the occupant above the seat surface in the fully expanded state when each of the side cushions have completed expansion and deployment, and is held in place by the occupant, pulling each of the side cushions inward.

2. The airbag device according to claim 1, wherein in the fully expanded state, the connecting part connects the front part of the first side cushion to the front part of the second side cushion.

3. The airbag device according to claim 2, wherein in the fully expanded state, both the connecting point of the connecting part of the first side cushion and the connecting point of the connecting part of the second side cushion are located more forward than the torso of the occupant in the front-to-back direction.

4. The airbag device according to claim 1, wherein in the fully expanded state, in the rear surface region, the connecting part is located in a height range from the waist to the shoulder of the occupant.

5. The airbag device according to claim 1, further comprising:

a cushion connecting part connecting, in the fully expanded state, the rear part of the first side cushion and the rear part of the second side cushion, wherein integrating the first side cushion, second side cushion, and cushion connecting part with each other composes one airbag, and the connecting part is stowed in the seat folded with the airbag in a state overlapped on the lower side of the airbag in a fully expanded state.

6. The airbag device according to claim 1, further comprising:

a cushion connecting part connecting, in the fully expanded state, the rear part of the first side cushion and the rear part of the second side cushion, where the connecting part connects to the front part of the first side cushion and the cushion connecting part, or the rear part of the second side cushion.

7. The airbag device according to claim 1, wherein the first side cushion has a first head cushion part that expands and deploys to cover one side of the head of the occupant, the second side cushion has a second head cushion part that expands and deploys to cover the other side of the head of the occupant, and the connecting part connects the top part of the first head cushion part and the top part of the second head cushion part.

8. The airbag device according to claim 1, wherein the connecting part, in the fully expanded state, passes through the rear surface region from the side of one side of the occupant to the side of the other side of the occupant.

9. The airbag device according to claim 1, wherein the connecting part, in the fully expanded state, partially passes through the interior of the seat.

10. The airbag device according to claim 1, wherein the connecting part has:

a first member connected at a first end to the first side cushion and at a second end to the seat; and a second member connected at a first end to the second side cushion and at a second end to the seat, and connects the first side cushion to the second side cushion via the seat.

11. The airbag device according to claim 1, further comprising:

a forward protecting cushion part attached to the front part of each of the first side cushion and second side cushion as to be connected to each of the cushions and covering the occupant from the forward direction in a fully expanded state, that connects the front part of the forward protecting cushion part on the first side cushion side to the front part of the forward protecting cushion part on the second side cushion side.

12. The airbag device according to claim 11, comprising:

a first belt and a second belt that straddle the first side cushion and second side cushion and restrain, in the fully expanded state, the first side cushion and second side cushion from the exterior, where the coupling between the first belt and second belt is secured to the seat.

* * * * *